United States Patent [19]
Hale

[11] 3,879,075
[45] Apr. 22, 1975

[54] ENERGY ABSORBING BUMPER GUARD

[75] Inventor: Clifford E. Hale, Ann Arbor, Mich.

[73] Assignee: Gulf & Western Manufacturing Company, Dearborn, Mich.

[22] Filed: Mar. 19, 1974

[21] Appl. No.: 452,616

[52] U.S. Cl. ................. 293/71 R; 267/140; 293/85
[51] Int. Cl. ............................................ B60n 19/02
[58] Field of Search ........ 267/140, 141, 139; 293/1, 293/71 R, 85, 86, 88; 114/219; 188/1 C

[56] References Cited
UNITED STATES PATENTS

| | | | |
|---|---|---|---|
| 2,251,347 | 8/1941 | Williams et al. | 293/1 |
| 3,097,725 | 7/1963 | Peterson | 293/1 |
| 3,178,036 | 4/1965 | Cardwell | 188/1 C |
| 3,209,864 | 10/1965 | Boyd | 188/1 C |
| 3,361,467 | 1/1968 | Ludwikowski | 267/140 X |
| 3,365,189 | 1/1968 | Carlson | 188/1 C |
| 3,371,442 | 3/1968 | Carlson | 267/141 X |
| 3,610,609 | 10/1971 | Sobel | 267/140 |
| 3,659,835 | 5/1972 | Peterson | 188/1 C |
| 3,666,310 | 5/1972 | Burgess et al. | 293/71 R |
| 3,797,818 | 3/1974 | Willich et al. | 293/85 X |

*Primary Examiner*—M. Henson Wood, Jr.
*Assistant Examiner*—Andres Kashnikow
*Attorney, Agent, or Firm*—Meyer, Tilberry & Body

[57] ABSTRACT

An energy absorbing bumper guard is provided which is mountable on a vehicle bumper. The energy absorbing device is comprised of inner and outer telescopically associated metal members, the outer member of which has an inner end contoured to mate with the outer surface of a vehicle bumper on which the device is to be mounted. The inner member defines an impact receiving component reciprocable toward and away from the bumper. Compressible cellular material fills the interior of the two members to bias the inner member away from the bumper. The bumper surface defines a back-up plate for the cellular material and a pair of metal straps extend between the opposed walls of the outer member adjacent the inner end thereof for mounting the bumper guard to a vehicle bumper and for restraining radial displacement of the tubular outer member when the cellular material is compressed. The telescoping tubular members are relatively dimensioned in cross-section so that, upon compression of the cellular material by movement of the inner member towards the bumper, a portion of the cellular material exudes between the inner and outer members to restrain lateral displacement of the inner member relative to the outer member.

21 Claims, 6 Drawing Figures

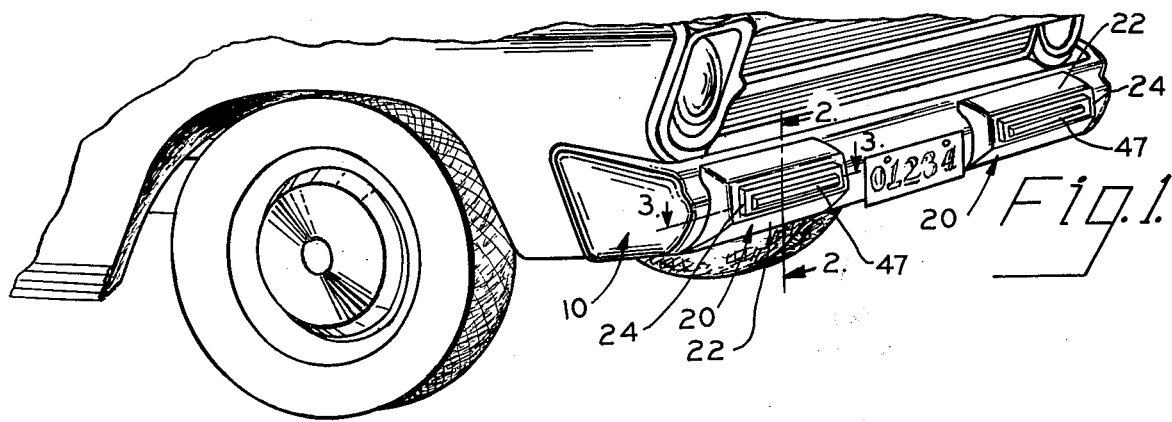
Fig.1.
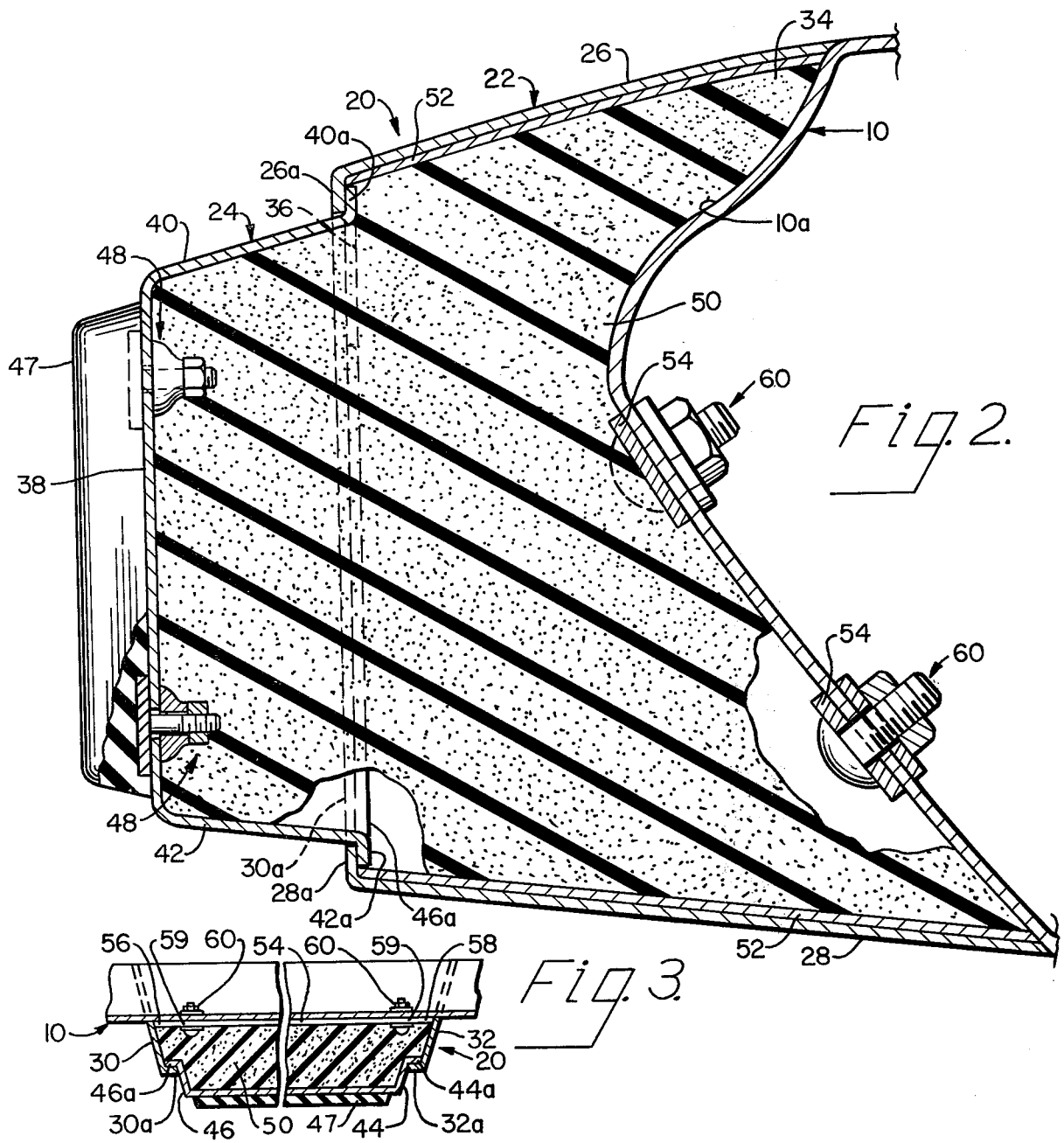
Fig.2.
Fig.3.

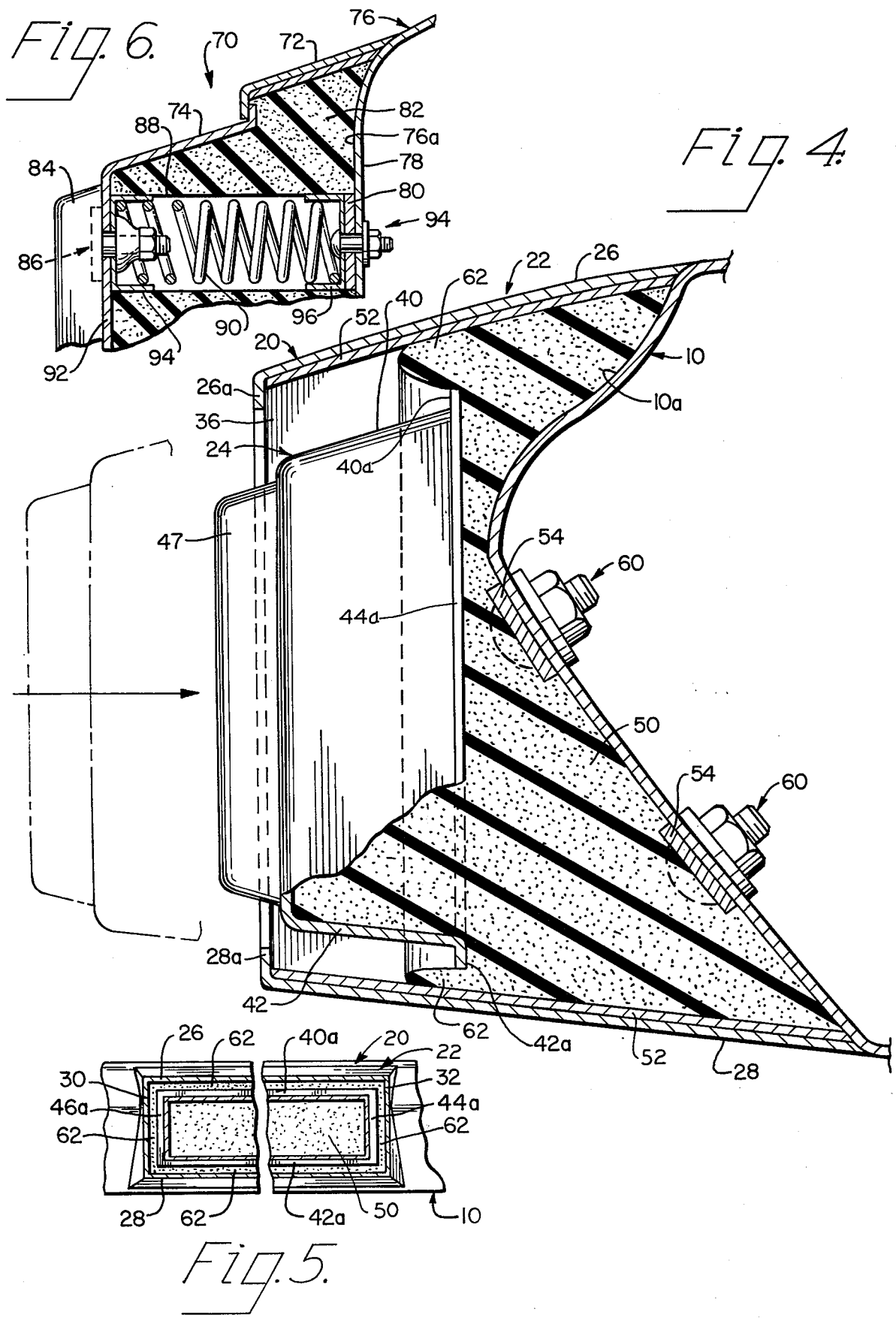

ENERGY ABSORBING BUMPER GUARD

The present invention relates to the art of protective devices for vehicles and, more particularly, to an energy absorbing device in the form of a bumper guard mountable on a vehicle bumper.

Bumper guards have been provided heretofore for the purpose of protecting a vehicle bumper from damage caused by minor impact thereof with an obstacle such as another vehicle. The vehicle bumper generally is a unitary component extending across the entire width of a vehicle and, accordingly, is an expensive item to replace. Bumper guards are therefore advantageous in that minor impacts, such as those which might occur during parking of a vehicle or during low speed collision with another vehicle or obstacle will at most damage the bumper guard which is more readily and more economically replaced than the bumper.

Bumper guards heretofore provided are generally chrome plated steel stampings which are bolted to a vehicle bumper. In some instances, a rubber strip or impact cushion is attached to the outermost surface of the bumper guard to provide a cushioning effect to protect the bumper guard from scratching, minor denting and the like. While bumper guards of the latter character are advantageous in protecting the vehicle bumper in the manner described above, it remains that there are instances in which the bumper guard is damaged to the extent that replacement is necessary or desirable even though the bumper of the vehicle may not itself be damaged. Further, the rigidity of such bumper guards can result in damage to the bumper which, though of a minor nature, renders the bumper undesirable for austhetic reasons. In other words, there is a range of impact forces or conditions between those which result in little or no damage to the bumper guard and those which result in damage to the bumper guard or the bumper guard and bumper and which impact forces or conditions are not of such proportions as to cause major damage to the bumper member. Accordingly, it becomes advantageous to provide a bumper guard structure which is capable of absorbing impact forces in the latter range to afford increased protection both for the bumper guard and the bumper.

Efforts have been made heretofore to provide bumper guard structures of the latter character, such as by providing for portions of the bumper guard to be relatively displaceable in response to an impact thereagainst and to be biased in the opposite direction upon relief of the impact. Such previous efforts include the provision of coil springs or the like between the relatively displaceable components or the provision of compressible cellular material between the components.

While the bumper guards resulting from these previous efforts serve to provide the desired protection against impacts of the character described above, it remains that these devices have several disadvantages which detract from the acceptability thereof both by the buying public and by automobile manufacturers. In this respect, certain of the devices heretofore known tend to bind during relative displacement of the components thereof, which binding reduces the effectiveness of the bumper guard during impact or the satisfactory return movement of the displaced component following impact. Further, certain of the devices heretofore known are structurally complicated and include a considerable number of parts which must be assembled relative to one another and to the vehicle bumper, whereby they are undesirably expensive to manufacture, install and maintain. Another disadvantage of previous devices of this character lies in the fact that the structural configuration necessary to achieve the desired results provides a bumper guard which is unattractive in appearance and thus less desirable from an austhetic standpoint. When it is considered that the general public places considerable weight on the appearance of a vehicle to be purchased, the appearance of the bumper guards becomes quite important. Yet another disadvantage attendant to bumper guards heretofore provided and of the character employing compressible cellular material as the impact absorbing medium resides in the fact that the portion of the bumper guard in which the compressible material is disposed may become distorted due to compression and resultant lateral expansion of the material during an impact or a number of successive impacts. While the latter drawback may be overcome by employing heavier gauge materials, the latter solution disadvantageously increases the cost of the bumper guard. Further, the structural arrangements of prior bumper guard assemblies enploying compressible cellular material do not adequately protect the latter material from exposure to deleterious elements such as rain and dirt, whereby the useful life of the material is undesirably reduced as a result of such exposure.

In accordance with the present invention, the foregoing disadvantages and others of previous bumper guard devices are advantageously overcome. In this respect, and in accordance with one aspect of the present invention, a bumper guard is comprised of a pair of telescopically associated metal members which are relatively movable between extending and retracted dispositions. The members are normally biased toward the extended disposition by impact absorbing means therebetween and are displacable toward the retracted or collapsed disposition against the bias of the impact absorbing means in response to an impact against the one of the members which serves as an impact receiving component. The other of the members is, of course, attached to a vehicle bumper. The telescopically associated members are provided with cooperable stops which limit relative movement therebetween in the direction toward the extended disposition thereof. Moreover, the structural configurations of the telescopically associated members provide for the bumper guard assembly to be economically produced, assembled and attached to a vehicle, and provide for the bumper guard attachment to exhibit a substantially continuous line or surface appearance which in itself is decorative and lends to the overall decorative appearance of the vehicle bumper assembly.

In accordance with another aspect of the present invention, the impact absorbing means is a compressible cellular material operatively interrelated with the telescopically associated bumper guard members in a manner whereby the material both absorbs the force of impact against the impact receiving member and guides the relative displacement between the two members in a manner whereby binding therebetween is avoided and proper return movement of the impact receiving member following an impact is assured. The guiding or stabilizing capability is achieved in accordance with the present invention by providing for the telescopically associated members to be relatively dimensioned in cross section such that portions of the members are radially spaced apart at least during a portion of the relative movement therebetween during impact so that a portion of the compressible cellular material is exuded into the space between the two members. The relative dimensioning may provide for exuding of the compressible material into a peripheral space extending capability about the two members, or into a radial space or spaces between any two radially opposed portions of the two members. In the latter instance, further guiding and stabilizing capability can be achieved by providing for other portions of the members to be disposed in relative sliding engagement with one another. In accordance with another feature relating to guidance stability and return movement of the impact receiving member one or more compressible springs can be employed in conjunction with the cellular material. Such springs stabilize against relative lateral movement between the bumper guard members, assist in guiding movements of the impact receiving member, and lend flexibility with respect to the choice of cellular material used.

In accordance with yet another aspect of the present invention, the bumper guard member which is attached to the vehicle bumper has an end facing the outer surface of the bumper and contoured to mate therewith. The cellular material fills the latter member and is contoured for the inner end thereof to conform with the outer surface of the vehicle bumper within the confines of the bumper guard member. Thus, the surface of the bumper advantageously provides a back-up plate for the compressible material, thus eliminating the necessity for a separate back-up plate component and, accordingly, reducing manufacturing costs. Moreover, the bumper guard members and bumper cooperably define a chamber for the cellular material and which protects the material from exposure to deleterious environmental elements.

In accordance with still another aspect of the present invention the inner end of the bumper guard member attached to the bumper is provided with means which serves both to mount the bumper guard on a bumper and to restrain lateral displacement or distortion of the bumper guard member due to radial expansion of the compressible material during an impact. Preferably, this is achieved by at least one metal strip having ends connected to opposed portions of the inner end of the bumper guard member and portions spaced from the ends and connected to the vehicle bumper. By providing for the mounting and restraining functions to be achieved in this manner, the time required to mount the bumper guard is maintained at a minimum and the cost of production is reduced in that lighter gauge metal for the bumper guard member can be employed then would be required otherwise.

An outstanding object of the present invention is the provision of a bumper guard of the character comprising relatively movable bumper guard members and which is comprised of a minimum number of components structurally interrelated in a manner to provide for the bumper guard to be readily and economically produced, readily mountable on a vehicle bumper, decorative in appearance and efficient and reliable in operation.

Another object of the present invention is the provision of a bumper guard of the above character in which relative movement between the bumper guard members is guided and stabilized to increase the reliability of operation thereof.

A further object of the present invention is the provision of a bumper guard of the foregoing character in which a compressible material defines the energy absorbing medium against the bias of which the members are relatively movable and in which the bumper guard members and compressible material are readily assembled into an operable unit for mounting on a vehicle bumper.

Still a further object of the present invention is the provision of a bumper guard of the above character wherein a relatively movable member is structurally interrelated with one another and with the energy absorbing material in a manner whereby the energy absorbing material stabilizes and guides one of the members during movement thereof relative to the other.

Yet another object of the present invention is the provision of a bumper guard of the above character adapted to be interconnected with a vehicle bumper in a manner whereby the bumper surface provides a back-up plate against which the energy absorbing material is compressed during an impact against the bumper guard.

Still another object of the present invention is the provision of a bumper guard of the above character which is stabilized against distortion or displacement due to the radial expansion of the energy absorbing material which results from compression thereof within the bumper guard.

The foregoing objects and others will in part be obvious and in part more fully pointed out hereinafter in conjunction with the description of the accompanying drawing in which:

FIG. 1 is a perspective view of a portion of a vehicle and illustrates a vehicle bumper provided with one form of bumper guards made in accordance with the present invention;

FIG. 2 is an elevation view, in section, of a bumper guard illustrated in FIG. 1, the section being along line 2-2 in FIG. 1;

FIG. 3 is a plan view, in section, of the bumper guard, the section being along line 3—3 in FIG. 1;

FIG. 4 is a side elevation view, in section, similar to the view in FIG. 2 and illustrating the impact receiving member of the bumper guard in its retracted disposition;

FIG. 5 is a front elevation view, in section, illustrating the impact receiving member in its retracted disposition; and FIG. 6 is a side elevation view, in section, illustrating a modification of the bumper guard structure.

Referring now in greater detail to the drawings wherein the showings are for the purpose of illustrating preferred embodiments of the present invention only and not for the purpose of limiting the same, FIG. 1 illustrates a vehicle such as an automobile having a bumper 10 extending thereacross and around the corresponding sides of the vehicle. It will be appreciated that while the invention finds particular utility in conjunction with protecting the bumpers of automotive vehicles, it is readily applicable to the protection of bumpers or corresponding components of other types of vehicles. Moreover, while the bumper in FIG. 1 is illustrated as being the front bumper of a vehicle, it will be appreciated that the present invention is applicable to the provision of bumper guards for the front and/or back bumpers of a vehicle.

Bumper 10 is provided with a pair of bumper guards designated generally by the numeral 20. While two bumper guards are illustrated it will be appreciated that one or more of the bumper guards could be mounted on the bumper and that the overall dimensions of the bumper guard relative to the vehicle bumper can be varied as desired. Preferably, where two or more bumper guards are employed they would be of similar construction and appearance although it will be appreciated that this is not absolutely necessary. For purposes of the present description it will be assumed that bumper guards 20 are identical structurally whereby it will only be necessary to describe one of the bumper guards in detail.

Referring now to FIGS. 2 and 3 of the drawing, bumper guard 20 is comprised of telescopically associated outer and inner metal members 22 and 24, respectively. Outer member 22 is adapted to be interconnected with vehicle bumper 10 in a manner set forth more fully hereinafter, and inner member 24 defines the impact receiving component of the assembly. Outer member 22 preferably is of one piece construction and is tubular in transverse cross section. In the embodiment illustrated outer member 22 is generally rectangular in transverse cross-section and includes a top wall 26, a bottom wall 28, and side walls 30 and 32. Member 22 has an open inner end 34 and an open outer end 36 through which member 24 extends. Further, the outer ends of walls 26, 28, 30 and 32 terminate in inwardly directed flanges 26a, 28a, 30a and 32a, respectively.

Impact receiving member 24 preferably is of one piece construction and is generally cup-shaped in plan and side elevation section and generally rectangular in transverse cross-section. Member 24 includes an end wall 38, a top wall 40, a bottom wall 42 and side walls 44 and 46. Walls 40, 42, 44, and 46 extend from end wall 38 toward bumper 10 and into the open end of member 22 where the walls terminate in radially outwardly extending flanges 40a, 42a, 44a and 46a, respectively. The latter flanges are disposed behind the flanges of outer member 22 whereby the flanges of the two members cooperate to limit movement of inner member 24 outwardly relative to member 22 and bumper 10. It will be noted that the inner edges of flanges 26a, 28a, 30a and 32a terminate closely adjacent the outer surfaces of the corresponding walls of member 24, whereby the discontinuity therebetween is not readily visible and the attractive appearance of the bumper guard is enhanced. End wall 38 may be provided with a cushioning strip 47 of suitable material such as rubber or plastic and which strip may be attached to wall 38 by any suitable means such as fastener assemblies 48.

Members 22 and 24 are each preferably in the form of a one piece component of suitable metal such as chrome plated steel and may be readily produced such as by drawing or stamping, for example. While chrome plated steel is the preferred material from which the bumper guard members are made, it will be appreciated that other metals may be employed.

Walls 26, 28, 30 and 32 at the inner end of bumper guard member 22 are contoured for the inner end of member 22 to mate with the outer surface contour of vehicle bumper 10 which contour will of course vary from one make of vehicle to another. In any event, when outer member 22 is mounted on the vehicle bumper the bumper guard members 22 and 24 together with the other surface 10a of bumper 10 cooperatively define a chamber adapted to receive compressible cellular material 50 which defines the energy absorbing medium for the bumper guard assembly. Material 50 may be defined by any suitable elastomeric material adapted to absorb the energy of an impact against member 24, and preferably, has a slow return characteristic from the compressed state for biasing member 24 toward the extending position thereof. Material 50 may be defined, for example, by a suitable foamed plastic, rubber, or silicone material. Material 50 preferably is in the form of a precast block contoured to generally fill the chamber defined by members 22 and 24 together with bumper surface 10a. In this respect, the pre-cast block will have a contour at its inner end corresponding to a contour of outer surface 10a of the vehicle bumper. It will be appreciated, however, that members 22 and 24 could be assembled and material 50 cast in place therein. It will be noted too, that the contouring of inner end of member 22 to mate with bumper surface 10a provides for the chamber for material 50 to be effectively sealed against the ingress of water, dirt or other contaminants which can adversely affect the cellular material. Such sealing is further enhanced by the flat interengaging stop flanges between members 22 and 24.

Member 22 preferably is mounted on bumper 10 by means of one or more straps 54 which perform a dual function. In this respect, straps 54 have ends 56 and 58 suitably interconnected with a corresponding one of the opposed side walls of inner member 22, such as by welding, staking or rivetting, and inner portions 59 from the ends 56 and 58 and by which the straps are suitably fastened to bumper 10 such as by bolt and nut assemblies 60. Preferably straps 54 each extend completely across the open inner end of member 22, but it will be appreciated that the straps could terminate at locations intermediate inner portions 59. The dual function performed by the strap or straps is that of mounting the bumper guard on the vehicle bumper and stabilizing the outer member 22 of the assembly against radial or lateral outward distortion of the walls thereof during operation of the bumper guard to absorb an impact against member 24. In this respect, compression of material 50 during an impact displaces the material toward bumper 10 whereby the material tends to expand radially outwardly toward the walls of member 22. Displacement or distortion of member 22 in response to such expansion forces is advantageously restrained by the straps, whereby the walls of member 22 can be of lighter gauge metal than would otherwise be required. The use of lighter gauge metal, of course, lends to reducing the cost of manufacture of the bumper guard.

Referring now to FIGS. 4 and 5 in conjunction with FIGS. 2 and 3, it will be noted that the top, bottom and side walls of outer member 22 diverge gradually from the outer ends thereof towards bumper 10. This provides for the inner surface of the portion of the chamber defined by outer member 22 to have transverse dimensions in the horizontal and vertical directions adjacent the outer end of the member which are less than the corresponding horizontal and vertical transverse dimensions at a location in the outer member spaced from the outer end thereof toward bumper 10. Further, it will be noted that the inner end of impact receiving member 24 as defined by flanges 40a, 42a, 44a and 46a has horizontal and vertical dimensions less than the corresponding horizontal and vertical dimensions of the inner surface of outer member 22 at the location therein spaced from the outer end thereof toward bumper 10. It will be further noted that the dimensions of the inner end of member 24 are no greater than the corresponding horizontal and vertical dimensions of outer member 22 adjacent the outer member thereof. This dimensional relationship provides for the impact receiving member to be displaced toward bumper 10 in response to an impact thereagainst and for a portion 62 of the material 50 to exude into the vertical and horizontal spaces between the outer edges of the flanges of member 24 and the corresponding inner surface portion of member 22, as illustrated in FIGS. 4 and 5. Such exuding of the material between the flanges of member 24 and the inner surface of member 22 is facilitated by providing for at least the portion of material 50 within member 22 to be free of adherence from the inner surface thereof. To assure such non-adherence both during assembly of the bumper guard and during subsequent use thereof such as might be caused by a chemical breakdown in material 50 leading to adhesion of the material to the inner surface of member 22, it is desirable to provide the inner surface of member 22 with a coating or lining 52 of a suitable material to which the cellular material 50 will not adhere. Such material may be a lubricant which remains liquid, such as a silicone lubricant, or may be a lining or coating in the form of a film bonded to the inner surface of member 22. Such lubricant lining or coating can be applied to member 22 in any suitable manner such as by brushing or spraying the material onto the inner surface or bonding a suitable lining in sheet form to the inner surface. Alternatively, if material 50 is a precast block, the adhesion preventing material can be applied to the outer surface thereof. The particular material for the lining does not form a part of the present invention and the selection of such material will, of course, vary, depending on the composition of energy absorbing material 50. One suitable combination of materials is defined by providing for material 50 to be a urethane foam and for the material 52 to be a coating of a silicone lubricant.

The exuding of material 50 between the flanges of member 24 and the inner surface of member 22 advantageously provides for the energy absorbing material to guide and stabilize movement of member 24 relative to member 22. In this respect, portion 62 of material 50 restrains horizontal and/or vertical displacement of member 24 relative to member 22 during movement of member 24 toward and away from bumper 10. This provides for member 24 to move relative to member 22 free of any binding engagement between the two members which can result in improper response of the assembly to an impact and damage to the relatively movable parts. Further, the exuded portion 62 of material 50 provides for the return movement of member 24 to its outermost position to be guided horizontally and vertically to avoid any binding interengagement between members 22 and 24 which might interfere with such return movement of member 24 and so that the flanges of the outer and inner members will properly engage one another to limit the movement of member 24.

The provision of a dimensional relationship between outer and inner members 22 and 24 to provide for exuding of material 50 therebetween is of further advantage in conjunction with the response of the bumper guard assembly to an impact against member 24 adjacent a top, bottom or side edge thereof as opposed to an impact directly against the center thereof. An impact against an edge of member 24 will push the corresponding side thereof inwardly toward bumper 10 in a pivotal relationship relative to the opposite side of the member. In other words, member 24 will be displaced into a tilted relationship relative to member 22. The side of member 24 which moves toward bumper 10 will be spaced from the corresponding inner surface portion of member 22, whereby material 50 will exude into the latter space. This exuding advantageously prevents member 24 from shifting laterally relative to member 22 in a direction which would move the spaced flange of member 24 towards the inner surface of member 22. Moreover, when the impact force is removed the exuded material between the flange of member 24 and the inner surface of member 22 provides a guiding function for return movement of member 24 to its outermost position. The movement of member 24 relative to member 22 under the foregoing circumstances is, accordingly, stabilized and guided by the material 50 and is free of any binding engagement between members 22 and 24 which might interfere with the relative movement therebetween either during or following the impact to which the bumper guard responds.

While it is preferred to provide for the dimensional relationship between the inner and outer members to be such that material 50 is exuded into a peripheral space between the members, it will be appreciated that at least certain of the foregoing advantages derived from exuding a portion of the material into a space between the two members can be achieved by providing for such exuding to occur along any one or more areas between the two members, or in a continuously interrupted manner. In this respect, for example, walls 30 and 32 of outer member 22 could be uniformly spaced apart a distance corresponding substantially to the horizontal distance between the outer edges of flanges 44a and 46a of member 24, and walls 26 and 28 of member 22 could diverge as illustrated. With this arrangement, flanges 44a and 46a would slidingly engage the corresponding inner surface portions of member 22 and material 50 would be exuded only between flanges 40a and 42a and the corresponding inner surface portions of member 22. Further, all of the walls of member 22 could be uniformly spaced apart from the outer toward the inner ends thereof a distance corresponding to or slightly greater than the spacing of the outer edges of the flanges of member 24, and the latter flanges could be peripherally interrupted rather than continuous so that a portion of material 50 would be exuded between peripherally adjacent flange portions and into the space between the corresponding wall of member 24 and the inner surface of member 22. It is only necessary that the inner end of member 24 have a transverse dimension relative to the inner surface of member 22 which will provide a space between the inner end and inner surface into which material 50 can exude.

As described hereinabove, the inner end of material 50 is disposed in face to face contact with outer surface 10 of bumper 10. Thus, the bumper defines a back-up plate which, of course, is necessary to achieve compression of material 50. Heretofore, such back-up plates have been provided as a separate element attached to one of the members of the bumper guard assembly and/or to the vehicle bumper. By providing for the vehicle bumper itself to serve as the backup plate a given quantity of material 50 required to achieve a desired degree of energy absorption can be provided in a minimum amount of space forwardly of the bumper. This advantageously reduces the extent to which the bumper guard assembly projects forwardly of the bumper and thus enhances the overall appearance of the bumper and bumper guard assembly. Moreover, the necessity of a separate back-up plate is eliminated, thus reducing manufacturing costs.

It will be further appreciated that the structural configuration and interrelationship of the several components of the preferred embodiment of the bumper guard assembly lends to both maintaining manufacturing costs at a minimum and simplifying the assembly operation. In this respect, members 22 and 24 are of one piece construction readily formed such as by stamping or drawing and cellular material 50 is pre-cast to the desired contour. To assemble the components it is only necessary to introduce member 24 through the open outer end of member 22 from inside thereof until the flanges of the members engage one another, insert the pre-cast block of material 50 into the members, and attach the strap components across the inner end of member 22. The assembly is then ready for mounting on a vehicle bumper, which mounting is readily achieved by means of nut and bolt fastener assemblies.

Referring now to FIG. 6 of the drawing, a further embodiment of the present invention is illustrated which finds particular advantage with regard to stabilizing and guiding relative movement between the bumper guard member during relative movement between the extended and retracted dispositions thereof and which facilitates return movement of the impact receiving member to its outer most position following an impact. In this respect, a bumper guard assembly 70 is illustrated which is comprised of outer and inner telescopically associated members 72 and 74 corresponding respectively to outer and inner members 22 and 24 of the embodiment illustrated in FIGS. 2 and 3 of the drawing. Bumper guard 70 is illustrated as being mounted on a vehicle bumper 76 having a substantially flat or straight portion 78 behind the bumper guard assembly as opposed to a curved portion such as that of bumper 10 illustrated in FIGS. 2 and 3. In a manner similar to that described hereinabove with regard to bumper assembly 20, one or more straps 80 are interconnected with opposed portions of outer member 72 adjacent the inner end thereof to facilitate mounting of the bumper guard assembly to bumper 76. Compressible cellular material 82 is provided within the bumper guard assembly, and the inner end of the material is disposed against outer surface 76a of bumper 76 so as to be compressed thereagainst in response to displacement of member 74 towards the bumper. In a manner similar to that of impact receiving member 22 illustrated in FIG. 3, member 74 may be provided with a pad or cushion of resilient material 84 suitably attached to member 74 such as by nut and bolt assembly 86.

In accordance with the embodiment illustrated in FIG. 6, cellular material 82 is provided with an opening 88 extending axially therethrough, and a compression spring 90 is disposed in the opening and between end wall 92 of member 74 and the opposed outer surface of strap 80. The opposite ends of spring 90 may be laterally positioned relative to wall 92 and strap 80 by corresponding spring cups 94 and 96. In the embodiment illustrated, the spring cups and accordingly spring 90 are advantageously retained in place by fastener assembly 86 and a fastener assembly 94 by which strap 80 and thus the bumper guard assembly are interconnected with bumper 76.

Member 72 and 74 of the bumper guard assembly have dimensional relationships similar to members 22 and 24 described hereinabove, whereby a portion of compressible cellular material 82 is adapted to be exuded therebetween during displacement of member 74 towards bumper 76. Spring 90 is adapted to cooperate with material 82 to define impact absorbing means within the bumper guard assembly and biasing means for returning member 74 to its outermost position following an impact. Further, the spring advantageously cooperates with the exuded portion of material 82 between members 72 and 74 to stabilize member 74 against lateral displacement relative to member 72 during relative axial movements therebetween. Spring 90 further provides flexibility with regard to the choice of the compressible cellular material to be employed. In this respect, a cellular material having suitable characteristics in compression but less than desirable characteristics with regard to return movement to its uncompressed condition can be employed, and the spring will provide return movement bias to augment that of the cellular material and accordingly provide a desired return movement capability following impact.

While only a single spring 90 is illustrated in FIG. 6, it will be appreciated that a plurality of springs can be employed and positioned within member 72 and 74 as desired. For example, if the bumper guard assembly is square or rectangular in transverse cross-section as in the embodiment illustrated in FIGS. 2 and 3, it may be desirable to provide springs adjacent the four corners of the assembly. Alternatively, it may be desirable to provide a single line or row of such springs between the sides of the bumper guard assembly and centrally with regard to the top and bottom walls of the bumper guard members. The number and positioning of such springs will vary depending on the degree of spring assistance desired and the structural configuration of the bumper guard assembly. As a further example in this respect, if the bumper guard assembly is circular in transverse cross-section a single spring disposed coaxially with the could of the bumper guard members coule be sufficient.

It will be appreciated too that the spring or springs 90 could be embedded in cellular material 82 as opposed to being disposed in openings therethrough. Further, while mounting strap 80 advantageously provides a suitable back-up plate for the spring as well as a mounting strap for the assembly, it will be appreciated that the spring and mounting strap may be disposed other than in an aligned relationship as illustrated and that the vehicle bumper or other plate means defining a back-up surface for the spring could be employed. It will be further appreciated that where the mounting strap for the bumper guard assembly is inclined with respect to horizontal in a manner similar to that of mounting straps 54 a retaining cup similar to cup 96 can be employed which would have a side wall extending from the bumper in a horizontal disposition and a bottom wall inclined to mate with the incline of the bumper surface. Further, if in the latter situation the inner end of the spring is not in alignment with the nut and bolt assembly by which the bumper guard assembly is interconnected with the vehicle bumper, the portion of the mounting strap between the fastener assemblies could be bent to a vertical disposition in which the strap portion would be disposed perpendicular to the spring axis. Suitable fastening means separate from the fastener assemblies for attaching the bumper guard assembly to the vehicle bumper would then be employed to secure the inner end of the spring in place with respect to the mounting strap.

While the compressible spring feature has been described in conjunction with and is particularly advantageous in conjunction with the feature of exuding a portion of the cellular material between the inner and outer members of the bumper guard assembly, it will be appreciated that the advantages derived from the use of one or more springs in conjunction with compressible cellular energy absorbing material can be obtained independent of the material exuding feature. In this respect, regardless of whether the dimensional relationships between the inner and outer members or the extent to which the chamber is filled laterally with the cellular material is such that exuding is provided for, the spring or springs will still operate in conjunction with the cellular material to absorb energy during impact and guide and stabilize movement of the impact receiving member during impact and return movement thereof. For example, in the embodiment illustrated the lateral dimensions of compressible material 82 could be less than the corresponding lateral dimensions of the inner end of impact receiving member 74, whereby compression of material 82 in response to impact movement of member 74 would not result in exuding of material 82 between member 72 and 74. It will be appreciated that a spring or springs 90 nonetheless would stabilize member 74 against lateral displacement relative to member 72 and would guide movement of member 74 free of binding interference with member 72.

While considerable emphasis has been placed herein on the fact that the inner and outer members of the bumper guard assemblies are substantially rectangular in transverse cross-section, it will be appreciated that other contours could readily be employed. For example the members could be of square, round, triangular or oval in cross-section without departing from the principles of the present invention. Further, it will be appreciated that the inner member of the assemblies could be a solid component as opposed to being of hollow cup-shaped configuration, or that the inner end thereof could be covered by means such as a metal plate so that material 50 or material 82 and spring 90 would abute thereagainst as opposed to extending to the end wall of the inner member as in the illustrated embodiments. Still further, it will be appreciated that the relative dimensional relationships between the inner and outer members which provide for exuding of material 50 and 82 therebetween could be achieved other than by providing for the walls of the outer member to gradually diverge as in the preferred embodiments. In this respect, the inner surface of the outer member adjacent the outer end thereof could be larger in transverse dimension than the inner end of the inner member when the two members are in their extended disposition.

With this arrangement the walls of the outer member could be uniformly spaced apart or could converge from the outer ends thereof towards the bumper and still provide a space along the path of movement of the inner member from its extended towards its retracted disposition into which the cellular material would exude. Still further, it will be appreciated that means other than the flanges on the outer end of the outer member and the inner end of the inner member could be provided to define stop means for limiting relative movement between the members in the direction away from the vehicle bumper. Many modifications of the stop arrangement illustrated herein will be apparent to those skilled in the art upon reading the description, and many alternative arrangements are possible in which flanges on the members would not be necessary. For example, the integral flanges on the inner member could be eliminated and a plate employed to cover the inner end and engage the compressible material. The flanges on the outer end of the outer member could then be extended radially inwardly to engage the outer surfaces of the walls of the inner member to limit movement of the inner member away from the bumper. Alternatively, the walls of the inner and outer members could be cooperatively tapered for surface to surface engagement between the outer surfaces of the walls of the inner member and the inner surfaces of the walls of the outer member to limit relative movement of the inner member relative to the outer member in the direction away from the bumper. Still further, it will be appreciated that the inner end of the outer member of the bumper guard assembly of the present invention can be contoured to mate with the outer surface contour of any given bumper, the bumper contours disclosed herein merely being illustrative of two such contours. It will be appreciated too that while the outer members of the bumper guard assemblies in the embodiments herein described are illustrated as being attached to the vehicle bumper, the principles of the present invention are equally applicable to the provision of a pair of telescopically associated bumper guard members in which the inner member of the assembly is attached to the vehicle bumper and the outer member is displacable relative to the bumper. In this respect, in the illustrated embodiments, the closed end of the inner member could be opened and contoured to mate with the outer surface of a vehicle bumper, and the inner end of the outer member could be closed. The inner member could then be provided with the mounting straps and attached to the vehicle bumper, and the bumper guard assembly would operate in accordance with the principles of the present invention.

As many possible embodiments of the present invention may be made, and as many changes may be made in the embodiments herein illustrated and described, it is to be distinctly understood that the foregoing descriptive matter is to be interpreted merely as illustrative of the present invention and not as a limitation.

Having thus described my invention, I claim:

1. An energy absorbing device for a vehicle bumper comprising telescopically associated inner and outer members, said inner member having an end disposed in said outer member and said members being relatively reciprocable between extended and collapsed dispositions in which said end of said inner member is disposed respectively in first and second positions relative to said outer member, and compressible cellular material in said outer member in the area between said first and second positions, at least a portion of said end of said inner member and a portion of the inner surface of said outer member being relatively dimensioned transversely of the direction of reciprocation so that said end and inner surface portions are radially spaced for a portion of said cellular material to exude therebetween during movement of said end from said first toward second position, and lining means between said inner surface and cellular material to prevent adherence of said cellular material to said inner surface.

2. The energy absorbing device of claim 1, wherein another portion of said end of said inner member and another portion of said inner surface of said outer member are relatively dimensioned in a second direction transverse to the direction of reciprocation for said another portions to be in sliding engagement during movement of said end between said first and second positions.

3. An energy absorbing device for a vehicle bumper comprising telescopically associated inner and outer members, said inner member having an end disposed in said outer member and said members being relatively reciprocable between extended and collapsed dispositions in which said end of said inner member is disposed respectively in first and second positions relative to said outer member, compressible cellular material in said outer member in the area between said first and second positions, at least a portion of said end of said inner member and a portion of the inner surface of said outer member being relatively dimensioned transversely of the direction of reciprocation so that said end and inner surface portions are radially spaced for a portion of said cellular material to exude therebetween during movement of said end from said first toward second position, said outer member having an inner end contoured to mate with the contour of a vehicle bumper, means for mounting said outer member on a bumper, and stop means between said inner and outer members to limit relative movement therebetween in the direction toward the extended disposition thereof.

4. The energy absorbing device of claim 3, wherein said inner member is cup-shaped and includes an end wall spaced outwardly from said end thereof, said inner member, outer member and vehicle bumper cooperatively defining a chamber, and said cellular material substantially completely filling said chamber.

5. The energy absorbing device of claim 4, wherein said stop means includes flange means extending radially inwardly of said inner surface of said outer member and cooperable flange means extending radially outwardly from said inner member.

6. The energy absorbing device of claim 5, wherein said inwardly extending flange means is integral with said outer member at said outer end thereof and said outwardly extending flange means is integral with said inner member at said end thereof.

7. The energy absorbing device of claim 4, and means between the inner surface of said outer member and said compressible cellular material to prevent adherance of said material to said inner surface.

8. The energy absorbing device of claim 4, wherein the portion of said chamber defined by said outer member progressively increases in transverse cross sectional area from said outer end of the outer member toward said inner end thereof.

9. The energy absorbing device of claim 8 and means lining the inner surface of said outer member to prevent adherence of said cellular material thereinto.

10. An energy absorbing device for a vehicle bumper comprising telescopically associated inner and outer members, said inner member having an end disposed in said outer member and said members being relatively reciprocable between extended and collapsed dispositions in which said end of said inner member is disposed respectively in first and second positions relative to said outer member, compressible cellular material in said outer member in the area between said first and second positions, at least a portion of said end of said inner member and a portion of the inner surface of said outer member being relatively dimensioned transversely of the direction of reciprocation so that said end and inner surface portions are radially spaced for a portion of said cellular material to exude therebetween during movement of said end from said first toward second position, said outer member having an inner end contoured to mate with the outer surface contour of a vehicle bumper, said inner member being cup-shaped and including an end wall spaced outwardly from said end thereof, said inner member, outer member and bumper surface cooperatively defining a chamber, said cellular material substantially filling said chamber, and means including strap means for mounting said outer member on a bumper, said strap means having ends connected to said outer member at substantially opposed positions about the periphery thereof and portions spaced from said ends for connection to the bumper.

11. The energy absorbing device of claim 10, wherein said strap means includes at least one strap extending across said outer member between said opposed positions.

12. An energy absorbing device for a vehicle bumper comprising a tubular member having wall means and an open inner end contoured to mate with the outer surface contour of a vehicle bumper, an impact receiving member telescopically associated with said tubular member and having a wall generally transverse to the axis of said tubular member, said impact receiving member being axially reciprocable relative to said tubular member between a first position in which said wall is spaced from said bumper and a second position in which said wall is spaced from said first position in the direction toward said bumper, compressible cellular material filling the space between said wall and bumper surface and being generally uncompressed when said wall is in said first position and being compressed when said wall is in said second position, and means for mounting said tubular member on a vehicle bumper and restraining radially outward displacement of said wall means of the tubular member when said cellular material is compressed.

13. The energy absorbing device of claim 12, wherein said mounting and restraining means includes strap means having ends connected to said wall means at generally opposed locations and portions spaced from said ends for connection with the bumper.

14. The energy absorbing device of claim 13, wherein said strap means includes at least one strap member extending across said open inner end of said tubular member.

15. An energy absorbing device for a vehicle bumper comprising, a tubular shell mountable on a vehicle bumper and having an open outer end spaced from said bumper, a cup-shaped member having outer end wall means and side wall means extending from said end wall means and into said shell through said open outer end thereof, said member being displaceable relative to said shell toward and away from said bumper, said shell and said member having cooperable radially overlapping stop means thereon to limit movement of said member away from said bumper, and energy absorbing means between said bumper and said outer end wall means of said member to cushion movement of said member toward said bumper and bias said member away from said bumper.

16. The energy absorbing device of claim 15, wherein said cup-shaped member, shell and bumper cooperatively define a chamber and said energy absorbing means is resilient compressible cellular material filling said chamber.

17. An energy absorbing device for a vehicle bumper comprising, a tubular shell mountable on a vehicle bumper and having an open outer end spaced from said bumper, a cup-shaped member having outer end wall means and side wall means extending from said end wall means and into said shell through said open outer end thereof, said member being displaceable relative to said shell toward and away from said bumper, said shell and said member having cooperable stop means to limit movement of said member away from said bumper, and energy absorbing means between said bumper and said outer end wall means of said member to cushion movement of said member toward said bumper and bias said member away from said bumper, said cooperable stop means including radially inwardly extending flange means at said open outer end of said shell and flange means extending radially outwardly from said side wall means of said member.

18. The energy absorbing device of claim 17, wherein said radially inwardly extending flange means is a peripherally continuous flange integral with said shell at the outer end thereof and said radially outwardly extending flange means is integral with said side wall means.

19. An energy absorbing device for a vehicle bumper comprising, a tubular shell mountable on a vehicle bumper and having an open outer end spaced from said bumper, a cup-shaped member having outer end wall means and side wall means extending from said end wall means and into said shell through said open outer end thereof, said member being displaceable relative to said shell toward and away from said bumper, said shell and said member having cooperable stop means to limit movement of said member away from said bumper, and energy absorbing means between said bumper and said outer end wall means of said member to cushion movement of said member toward said bumper and bias said member away from said bumper, said cup-shaped member, shell and bumper cooperatively defining a chamber, said energy absorbing means being resilient compressible cellular material filling said chamber, said cooperable stop means including radially inwardly, extending flange means at said open outer end of said shell and radially outwardly extending flange means on said side wall means of said member, said radially outwardly extending flange means being disposed in said shell for abutting engagement with said radially inwardly extending flange means when said member is biased away from said bumper.

20. The energy absorbing device of claim 19, wherein said radially outwardly extending flange means of said member has a dimension transverse to the direction of movement of the metal member toward said bumper less than a transverse dimension of the shell at a location therealong spaced inwardly from said radially inwardly extending flange means thereof, whereby a portion of said compressible cellular material in said chamber is exuded between said shell and outwardly extending flange means of said member when said member is disposed in said location.

21. An energy absorbing device for a vehicle bumper comprising a first member mountable on a vehicle bumper, an impact receiving member telescopically associated with said first member for movement relative thereto toward and away from said bumper, and energy absorbing means between said members to cushion movement of said impact receiving member toward said bumper and to bias said latter member away from said bumper, said energy absorbing means including compressible cellular material and compressible coil spring means, said first member being tubular and having an open inner end contoured to mate with the vehicle bumper, said impact receiving member having a wall spaced from said bumper, said cellular material being disposed within said first member and between said bumper and wall, and said spring means extending between said bumper and wall and through said cellular material.

* * * * *